United States Patent Office 3,721,715
Patented Mar. 20, 1973

3,721,715
ALKYLATION OF CONDENSED RING ARYLOLS
Donald M. Fenton, Anaheim, Calif., assignor to Union Oil Company of California, Los Angeles, Calif.
No Drawing. Filed Dec. 10, 1970, Ser. No. 97,032
Int. Cl. C07c 37/12
U.S. Cl. 260—624 C                                  11 Claims

ABSTRACT OF THE DISCLOSURE

Condensed ring arylols can be alkylated with an alkyl or cycloalkyl amine in the presence of a Group VIII noble metal catalyst complexed with a biphyllic ligand. A typical embodiment comprises the alkylation of naphthol with butylamine in the presence of a complex of ruthenium of triphenylphosphine in liquid phase under refluxing conditions and at atmospheric pressure. Preferably, the reaction is run under basic conditions and, if desired, elevated temperatures and pressures sufficient to maintain liquid phase conditions can be employed. The resulting products are useful as antioxidants or as intermediates in the manufacture of dyes and perfumes.

---

This invention relates to the preparation of alkylated arylols and in particular relates to a catalytic process for the alkylation of condensed ring arylols using an alkyl or cycloalkyl amine as the alkylating agent.

Conventional alkylation of aromatic compounds has involved acidic conditions. Thus, sulfuric acid, hydrofluoric acid or Friedel-Crafts are employed for the alkylation of aromatic compounds. The acidic conditions have precluded the use of various alkylating agents such as alkyl and cycloalkyl amines because these amines are reactive with the catalysts under the necessary alkylation conditions. Additionally, aryl compounds such as those bearing hydroxyl groups are similarly reactive with the acid catalyst.

It has now been found that condensed ring aromatics bearing one or more hydroxyl groups can be alkylated with an alkyl or cycloalkyl amine when the reaction is performed in the presence of a catalyst comprising a complex of a Group VIII noble metal and a biphyllic ligand. The reaction is performed under liquid phase conditions and at relatively mild conditions, including temperatures of from 30° to about 300° C. and a pressure from 1 to about 300 atmospheres, sufficient to maintain liquid phase conditions. Preferably, the reaction is performed under basic conditions in the presence of an alkaline material such as an alkali metal hydroxide. The reactants can comprise the liquid phase for the reaction or a suitable inert organic solvent can be employed. Preferably the reaction is performed under anhydrous conditions, i.e., in reaction media having water contents less than 10, preferably less than 5, and most preferably less than about 1 weight percent. Water, which can be formed by spurious side reactions, can be continuously removed during the reaction by azeotropic distillation or can be periodically removed by periodic removal of the reaction medium, distillation and return of the dehydrated reaction medium.

The condensed ring arylol which can be alkylated in accordance with this invention in general comprises any di or tricyclic arylol having one or two hydroxy groups and having up to about three alkyl ring substituents each having about 1 to 6 carbons, provided that at least one of the rings bearing a hydroxyl group contains an alkylatable carbon. Examples of suitable reactants comprise alpha naphthol, beta naphthol, 2,6-dimethylnaphthol-1, 7-amylnaphthol-1, 6,7-dihexylnaphtholdiol-1,2, 1,4-naphthadiol, 6-t-butylnaphthol-1, alpha-anthranol, 1,2-anthrandiol, 6,7-dipropylanthranol-1, 8-isopropylanthrandiol-1,4, 5 - hexylanthranol-2, phenanthranol-1, phenanthranol-2, phenanthranol - 9, phenanthranol-6, 5-t-butylphenanthranol-1, 8-hexylphenanthranol-3, 6,7-dimethylphenanthranol-3, etc.

The means which are useful as alkylating agents include the saturated hydrocarbon amines such as alkyl and cycloalkyl amines which have from 1 to about 25 carbons with alkyl or cycloalkyl groups that have from 1 to about 18 carbons. Cycloalkyl groups, when present, can have from 4 to about 12 cyclic carbons. The amine can be a primary, secondary or tertiary amine and the alkylation results in a reduction in the degree of nitrogen substitution of the amine. When the amine is in deficient supply and the reaction is run to exhaustion of the amine or when a primary amine is used, ammonia is formed. Intermediate conversions of the amine can form ammonia and primary amines from secondary amines and ammonia, primary and secondary amines from tertiary amines.

Examples of useful amines include: methylamine, ethylamine, isopropylamine, t-butylamine, amylamine, 2-ethylhexylamine, decylamine, dodecylamine, pentadecylamine, cyclopentylamine, methylcyclopentylamine, cyclohexylamine, diethylcyclohexylamine, cycloheptylamine, methylcyclooctylamine, cyclodecylamine, cycloundecylamine, cyclododecylamine, 3-cyclohexylpentylamine, diethylamine, trimethylamine, dicyclohexylamine, dibutylamine, triamylamine, methyldiisopropylamine, octadecylmethylamine, tri(2-ethylhexyl)amine, etc. Amines which are preferred are those having straight chain alkyl groups and those having from 1 to about 10 carbons because of the greater usefulness of arylol derivatives containing these alkyl side-chains.

The catalyst of the invention comprises a Group VIII noble metal which is in complex association with a biphyllic ligand. A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. These ligands are known in the art and, accordingly, are not part of the essence of the invention. Of these the phosphorus compounds, i.e., the phosphines, are preferred; however, the arsines, stibines and bismuthines can also be employed. Typical of the suitable ligands are those having the following srtucture:

$$E(R)_3$$

wherein E is trivalent phosphorus, arsenic, antimony or bismuth; and
wherein R is the same or different alkyl having 1 to 18 carbons, cycloalkyl having 4 to 18 carbons and/or aryl having 6 to 18 carbons. Examples of which are methyl, butyl, nonyl, cyclopentyl, cyclohexyl, cyclodecyl, amylcyclohexyl, phenyl, tolyl, xylyl, 2-phenyl-4-butyloctyl, tetramethylphenyl, etc. Preferably at least one R is aryl, e.g., phenyl, tolyl, xylyl, etc., preferably having 6 to 9 carbons and, most preferably, the ligand is triaryl.

Examples of suitable biphyllic ligands having the aforementioned structure and useful in my invention are the following: trimethylphosphine, triethylarsine, triethylbismuthine, triisopropylstibine, dioctylcycloheptylphosphine, tricyclopentylphospine, tricyclohexylphosphine, ethyldiisopropylstibine, tricyclohexylphosphine, methyldiphenylphosphine, methyldiphenylstibine, triphenylphosphine, triphenylbismuthine, tri(o - tolyl)phosphine, phenyldiisopropylphosphine, phenyldiamylphosphine, ethyldiphenylphosphine, phenylditolylphosphine, xylyldiphenylarsine, trixylylstibine, cyclopentyldixylylstibine, dioctoylphenylphosphine, tridurylphosphine, trixylxybismuthine, etc. Of the aforementioned, the aryl phosphines, preferably the diarylphosphines and, most preferably, the triarylphosphines (e.g., triphenylphosphine) are employed because of the increasing activity of the phosphines with increasing aromaticity.

The Group VIII noble metal may be ruthenium, rhodium, palladium, osmium, iridium or platinum. Ruthenium is preferred for its greater activity. A catalytic quantity of the metal is used (e.g., 0.002–2% of the reaction medium) and the metal can be added in any convenient manner such as a soluble salt, complex, acid or oxide or salt. Preferably the metal is added as a salt such as a halide (chloride, bromide, fluoride, iodide), nitrate, nitrite, $C_1$ to $C_{10}$ carboxylate e.g., acetate, propionate, butyrate valerate benzoate octanoate etc. Examples of useful Group VIII noble metal sources are rhodium nitrate platinum nitrate, palladium chloride, rhodium fluoride, palladium hydroxide, palladium cyanide, osmium sulfate, rhodium sulfite, rhodium carbonate, palladium carbonate, platinum propionate, ruthenium acetate, etc. Examples of suitable complexed sources are osmium carbonyl, ruthenium pentacarbonyl, potassium osmium chloride, osmium dipyridyl chloride, potassium ruthenium fluoride, rhodium carbonyl, iridium hydride triphenylphosphine, potassium rhodium fluoride, palladium nitroso chloride, chloroplatanic acid, etc. The particular source of the metal or element not being part of the essence of the invention since the metal from such widely varied sources will, nevertheless, form a complex with the aforementioned biphyllic ligand.

The Group VIII metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300%) of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide etc. may be but need not be, included in the complex catalyst of this invention. These components may be incorporated in the catalyst by the formation of the catalyst complex from a Group VIII metal salt of the indicated anions.

The reaction is performed under liquid phase conditions. Either the alkylating agent or the arylol reactant, or both, can be used in excess and furnish a liquid medium for the reaction. The reaction may also be performed in a liquid organic solvent, i.e., a liquid in which the reactants and the catalyst are soluble. Such a solvent should also be inert to the reactants, catalyst and products under the reaction conditions. Suitable solvents include, for example, hydrocarbons and ethers. Examples of hydrocarbon solvents are pentane, hexane, heptane, isooctane, dodecane, naphtha, cyclohexane, indane, benzene, toluene, xylene, durene, pseudocumene, Tetralin, etc. Examples of ethers are the alkyl and aryl ethers such as diisopropyl ether, di-n-butyl ether, ethylene glycol diisobutyl ether, methyl-o-tolyl ether, diethyl ether, diethylene glycol diethyl ether, triethylene glycol diethyl ether, tetraaethylene glycol dimethyl ether, etc.

The reaction may be performed at relatively low temperatures, e.g., 30° to 300° C. and preferably 150° to 250° C. and at low pressures, typically from about 1 to 300, preferably from 1 to about 100 atmospheres, absolute. Higher pressures can be employed if desired, however, such higher pressures do not serve any useful purpose in the reaction. Accordingly, it is desirable to employ only sufficient pressure to maintain liquid phase conditions.

The reaction is also preferably performed under basic conditions. Since the reactant mixture is somewhat basic, added base may not be necessary for the preferred conditions. When more alkaline conditions are desired, an alkaline material such as alkali metal hydroxide, e.g., sodium, potassium, lithium hydroxide, etc., can be added in an amount from about 0.1 to about 5 weight percent of the reaction.

The reaction may be carried out in a batch or in a continuous process. In the batch process, the reactants, catalyst and solvent, when employed, can be charged to the reaction zone and the reaction can be performed until a substantial amount or all of the reactant arylol compound has been alkylated.

One or more of the reactants can be continuously charged during this batch processing or some of the products can be continuously withdrawn during the conversion. The continuous introduction of the reactants and the continuous withdrawal of a crude reaction product containing the alkylated arylol compound results in a continuous processing. The crude reaction product removed from the alkylation can be treated in a conventional manner to recover the products, e.g., by solvent extraction, distillation, crystallization, etc. The reaction medium remaining after removal of the alkylated arylol compound can be recycled to the reaction zone together with any of the catalyst and unconverted arylol or amine reactant which are separated during the product recovery.

The following example will serve to illustrate a mode of practice of the invention and to demonstrate results obtainable thereby.

Example

A laboratory flask of 500 milliliter capacity is equipped with a Dean-Stark trap. Into the flask is introduced a reaction mixture of 0.5 gram ruthenium trichloride, 3 grams triphenylphosphine, 2 grams potassium hydroxide, 50 grams alpha naphthol and 110 milliliters tributylamine. The reactants are heated to and maintained at reflux for 48 hours. Upon completion of the reaction period, the reactants are analyzed and found to contain some butyl naphthol and 32 grams of dibutyl naphthols.

When the experiment is repeated with the substitution of palladium chloride for the ruthenium chloride, alkylation is still obtained.

When the experiment is repeated with the substitution of diphenylethylphosphine for the triphenylphosphine, similar results are obtained.

When the experiment is repeated with the substitution of phenanthranol-1 for the alpha naphthol, similar alkylation occurs.

When the experiment is repeated with the substitution of dicyclohexyl amine for the tributyl amine, cyclohexyl naphthol can be obtained.

The invention has been illustrated by the preceding examples which are intended solely to teach a mode of practice of the invention. It is not intended that the invention be unduly limited by this illustration. Instead, it is intended that the invention be defined by the reagents, conditions and steps, and their obviously equivalents set forth in the following claims.

I claim:

1. The alkylation of condensed ring arylols having from 8 to about 25 carbons with a di or tricyclic structure and one or two hydroxyl groups and up to about 3 alkyl groups having from 1 to about 6 carbons that comprises contacting, under anhydrous conditions, said condensed ring arylol with an alkyl amine having from 1 to about 25 carbons or cycloalkyl amine having from 4 to about 25 carbons with 4 to about 12 cyclic carbons in the presence of a complex of ruthenium and a biphyllic ligand having the following structure:

$$E(R)_3$$

wherein:

E is trivalent phosphorus, arsenic, antimony, or bismuth and wherein R is the same or different alkyl having 1 to 18 carbons, cycloalkyl having 4 to 18 carbons or aryl having 6 to 18 carbons;

at alkylation conditions comprising a temperature from 30° to about 300° C., sufficient to effect said alkylation, and a pressure from 1 to about 300 atmospheres, sufficient to maintain liquid phase conditions at said temperature.

2. The alkylation of claim 1 wherein said catalyst is a complex of ruthenium and an aryl phosphine.

3. The alkylation of claim 2 wherein said aryl phosphine is a triaryl phosphine.

4. The alkylation of claim 3 wherein said triarylphosphine is triphenylphosphine.

5. The alkylation of claim 4 wherein said contacting is performed in the presence of from 0.1 to about 5 weight percent, based on the liquid phase present, of an alkali metal hydroxide.

6. The alkylation of claim 5 wherein said amine is a trialkylamine.

7. The alkylation of claim 6 wherein said trialkylamine is tributylamine.

8. The alkylation of claim 1 wherein said arylol compound is a naphthol.

9. The alkylation of claim 2 wherein said amine is an alkylamine.

10. The alkylation of claim 9 wherein said alkylamine has 1 to about 10 carbons.

11. The alkylation of claim 1 wherein said temperature is maintained from 150° to about 250°.

References Cited
UNITED STATES PATENTS

| | | | |
|---|---|---|---|
| 3,267,169 | 8/1966 | Smutny | 260—612 D X |
| 3,518,318 | 6/1970 | Smutny | 260—624 C |

BERNARD HELFIN, Primary Examiner

U.S. Cl. X.R.

260—619 F; 252—431